United States Patent
Arnell

(10) Patent No.: US 6,408,626 B1
(45) Date of Patent: Jun. 25, 2002

(54) ARRANGEMENT AND METHOD FOR POWER TRANSMISSION IN COMBUSTION ENGINES

(75) Inventor: Jan Arnell, Hisings Kärra (SE)

(73) Assignee: AB Volvo (SE)

( * ) Notice: Subject to any disclaimer, the term of this patent is extended or adjusted under 35 U.S.C. 154(b) by 0 days.

(21) Appl. No.: 09/171,992

(22) PCT Filed: Apr. 25, 1997

(86) PCT No.: PCT/SE97/00695

§ 371 (c)(1),
(2), (4) Date: Oct. 28, 1998

(87) PCT Pub. No.: WO97/41338

PCT Pub. Date: Nov. 6, 1997

(30) Foreign Application Priority Data

Apr. 29, 1996 (SE) .............................. 96016563

(51) Int. Cl.⁷ .............................. F02B 37/04; F02G 3/00
(52) U.S. Cl. ............................. 60/624; 60/607
(58) Field of Search .................. 60/607, 608, 624; 464/24

(56) References Cited

U.S. PATENT DOCUMENTS 3,667,214 A * 6/1972 Addie .................. 60/608
4,048,872 A * 9/1977 Webb .................. 464/24
4,535,592 A   8/1985 Zinsmeyer ............... 60/597
4,622,818 A * 11/1986 Flaxington et al. ......... 60/624
5,310,382 A * 5/1994 Guimbretiere ............ 464/24
5,415,260 A * 5/1995 Abo et al. .............. 464/24

FOREIGN PATENT DOCUMENTS

| DE | 33 17 017 A1 | 11/1984 |
| EP | 0 420 705 A1 | 4/1991 |
| EP | 0 584 427 A1 | 3/1994 |
| SE | 7807407-7 | 8/1979 |
| SE | 8904374-9 | 6/1991 |
| WO | 80/00169 A1 | 2/1980 |

* cited by examiner

Primary Examiner—Michael Koczo
(74) Attorney, Agent, or Firm—Lerner, David, Littenberg, Krumholz & Mentlik, LLP

(57) ABSTRACT

The invention relates to an arrangement for power transmission in a combustion engine, comprising an outgoing exhaust pipe, at least one device for absorbing energy from exhaust gases in the exhaust pipe and/or at least one device for compressing air to the engine and a power transmission between at least one of said devices and a crankshaft of the engine. The invention is characterized in that said power transmission comprises power transmission means for the transfer of power via the shearing forces of a viscous medium. By means of the invention an improved power transmission in a turbo compound unit for combustion engines is obtained.

13 Claims, 2 Drawing Sheets

ARRANGEMENT AND METHOD FOR POWER TRANSMISSION IN COMBUSTION ENGINES

TECHNICAL FIELD

The invention relates to an arrangement for power transmission in a combustion engine, of the type which recovers energy from the exhaust gases. The invention also relates to a method for power transmission in a combustion engine, of the type which recovers energy from the exhaust gases.

BACKGROUND OF THE INVENTION

When designing combustion engines it is for several reasons, for example with regard to the environment and for reasons of cost, important to obtain a high degree of efficiency in the engine. It can be noted that the combustion gases which leave the combustion chamber in the combustion engine contain significant amounts of energy. In order to utilize these amounts of energy which would otherwise be lost, a turbo unit of a conventional kind can be connected downstream of the outlet from the exhaust chamber. Such a turbo unit essentially consists of a turbine which is rotated by the exhaust flow. The energy which is thus absorbed by the turbine is then transferred to a compressor which compresses the air on the intake side of the combustion engine. This means that a larger amount of fuel can be fed to a combustion chamber of a certain given size, whereby the efficiency of the engine can be increased.

The energy in the exhaust gases can also be recovered by leading the exhaust flow past a so-called turbo compound unit. Such a unit normally comprises two turbines which are arranged serially in the exhaust system of the engine, downstream of the combustion chamber. Both of the turbines are powered by the exhaust gases which flow through the exhaust system. The first turbine is part of a turbo unit of the above-mentioned kind, and is connected to a compressor belonging to the turbo unit. The other turbine is connected to the crankshaft of the engine. The energy which is absorbed by the second turbine is in this manner transferred to the crankshaft, thus giving it additional energy.

It is also possible to connect the two units in parallel to each other. It is of course also possible to use a single turbine which drives the crankshaft, without combining it with a conventional turbo unit.

Furthermore, a similar system can be utilized to transfer power from the crankshaft to another engine component, for example, a compressor which can be arranged in connection with the air intake of the engine. In this case, the power from the crankshaft is used to increase the amount of air which is supplied to the engine.

The above-mentioned systems have a common denominator in that they need a power transmission, i.e. a clutch and a gear mechanism, which is arranged between the crankshaft and the turbine (alternatively the compressor). In this way, the revolutions of the crankshaft, which during normal operation is approximately 2000 rpm, can be adjusted to the revolutions of the turbine (alternatively the compressor), which normally is approximately 100000 rpm.

In connection with combustion engines, the crankshaft is affected in a pulse-like manner by power impulses from the different cylinders. This causes variations in the number of revolutions of the crankshaft, which in turn causes noise problems and a risk for increased wear of the turbo compound unit. In particular, the variations in revolution cause an increased risk of high gear-loads in transmissions, and a risk of fatigue in the spindles of the turbines. The amplitude of the variations in revolution is furthermore highly amplified by the gearing in the above-mentioned power transmission. This imparts especially high demands on the power transmission.

Power transmission in a turbo compound unit can, according to previously known technology, be achieved with some kind of a mechanical connection. For example SE 8904374-9 shows the fitting of a cog-wheel on the crankshaft of the combustion engine, and connecting a turbine of a turbo compound unit to the cog-wheel via a number of cog-wheels and a hydrodynamic coupling. Such a hydrodynamic coupling consists of two mechanically separate, shovel-like members, which can rotate relative to each other inside a casing. These members have opposite surfaces which are positioned at a certain distance from each other, so that a slit-shaped space is formed between the surfaces. Oil is supplied to the space from a special feeding system. The oil can furthermore be transported to an oil trough and subsequently be re-used. During rotation of the first member, a torque is transferred to the second member, since the mass of the oil which is affected by the first member creates kinetic energy, which in turn transfers a torque to the second member.

A drawback of the hydrodynamic coupling is that the difference in the number of revolutions between the first and the second member is relatively large. This causes a high loss of power in the form of heat, which is transferred to the oil inside the casing. This power-loss must be removed by cooling, which in turn creates a need for special measures in the form of optimization and dimensioning of a cooling system. This is of course a drawback as regards cost and packing.

Another drawback of the hydrodynamical coupling relates to the fact that the rotating members due to centrifugal force eject particles, for example soot, against the inner walls of the casing. These particles are deposited on the inner walls of the casing, and can in the worst case cause clogging of the feeding or exhaust passage for the oil. Due to this, there is a need for expensive measures. Since the depositing of particles obstructs the transport of oil, the oil must be filtered before it can be re-used. This in turn creates a need for some kind of oil-filter, which must be used in order to have as few particles as possible fed into the casing. Alternatively, the inner walls of the casing can be provided with some kind of coating, for example teflon, in order to reject particles. This is also a drawback, since it increases the costs.

A further drawback when using hydrodynamic couplings is that they need a relatively large flow of oil in order to function. This creates high demands for the oil-supply system in the vehicle in which the turbo compound unit is used.

Another way of attenuating those vibrations which are caused in a turbo compound unit during operation of the engine is to use some kind of special attenuating device. For example SE 7807407-7 shows the use of a vibration attenuating device. Naturally, advantages as regards packing and cost would be obtained if there were not a need for a special vibration attenuating device when transferring power in the turbo compound unit.

SUMMARY OF THE INVENTION

The object of the present invention is to obtain an improved arrangement for recovering energy from the exhaust gases of a combustion engine, in which the drawbacks of previously known arrangements are eliminated. This object is achieved by means of an apparatus and a method as disclosed herein.

The invention comprises at least one device for absorbing energy from engine exhausts, and at least one device for compressing air to the engine. The invention furthermore comprises a power transmission between at least one of said devices and a crankshaft of the engine. The power transmission comprises power transmission means for transmitting power via shear forces in a viscous medium. In this way, the vibrations which occur during operation of the engine can be attenuated at the source of the disturbance, before they are amplified by gear-shifting. For example, torsional vibration in the crankshaft can be attenuated in an efficient manner by means of the invention. Furthermore, a lower noise level is obtained when engine braking, as are reduced cog-loads and a reduced risk for fatigue of rotor spindles. Furthermore, no extra filtering of engine oil is necessary, which is the case when using a hydrodynamic coupling. In comparison to the previously known hydrodynamic coupling, a better degree of efficiency for a turbo compound unit is also obtained with the invention.

Advantageous embodiments of the invention will become evident from the dependent claims.

DESCRIPTION OF THE FIGURES

The invention will be described in the following in greater detail, with reference to an example of an embodiment which is shown in the appended drawings, in which.

PREFERRED EMBODIMENT

Figure 1:
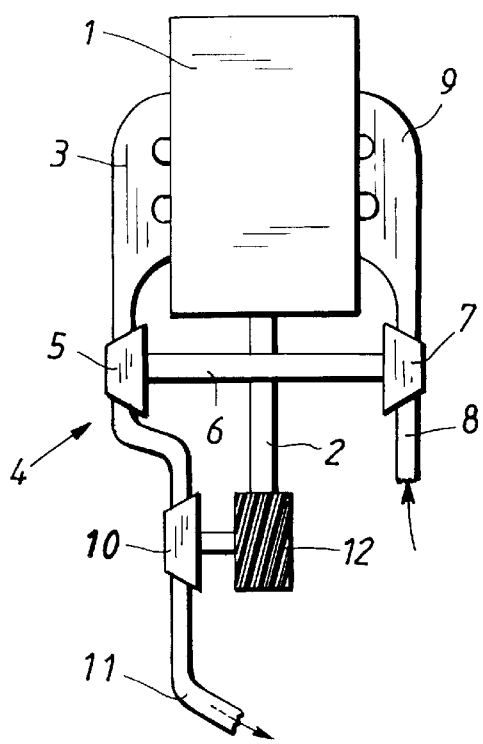
FIG. 1 schematically shows a combustion engine to which a turbo compound unit is connected, FIG. 2 schematically shows an alternative embodiment of the invention.

The combustion engine 1 which is shown in FIG. 1 powers an outgoing shaft 2. The engine 1 has an exhaust 3 in the shape of a manifold. The exhaust gases which are generated in the combustion chamber of the engine 1 are led through the exhaust 3. Although the drawing illustrates an exhaust 3 intended for three cylinders of the engine 1, the invention can also be used in connection with other cylinder configurations. The exhaust 3 terminates in a canal which passes an essentially conventional turbo unit 4. The turbo unit 4 comprises a first turbine 5 which is arranged on a spindle 6. On the spindle 6 there is also arranged a compressor 7, which is driven by the first turbine 5 and compresses the air in an inlet casing 9 of the engine 1. The air which is supplied to the compressor 7 via an air intake 8 is fed to the engine 1 through the inlet casing 9.

The exhaust gases which are led through the exhaust pipe 3 also drive a second turbine 10. The exhaust flow also causes the second turbine 10 to rotate, thus transferring energy from the exhaust gases. When the exhaust gases have transmitted part of their kinetic energy to the second turbine 10, they are transported away through an exhaust pipe 11.

According to the invention the second turbine 10 is connected to a power transmission 12, which in turn is connected to the outgoing crank-shaft 2 of the engine 1. In this way, power is transferred between the second turbine 10 and the outgoing shaft 2. The power transmission 12 in accordance with the invention comprises a so-called viscous coupling, the design and function of which will be described in detail below. The power transmission 12 also comprises a (not shown) gearing in order to transform the high speed of rotation of the second turbine 10 to a speed of rotation which is adapted to the crankshaft 2 of the engine 1.

As can be seen in FIG. 1, the turbine 10 is connected to the crankshaft 2 via the power transmission 12. More exactly, the turbine 10 is preferably fixedly attached to the crankshaft 2 via the outgoing spindle of the turbine 10 and the power transmission 12, so that the transfer of power between the turbine 12 and the crankshaft 2 takes place directly, i.e. preferably without any additional intermediate components. The arrangement according to the drawing is so arranged that the transmission of power can take place both to and from the crankshaft 2.

Figure 2:
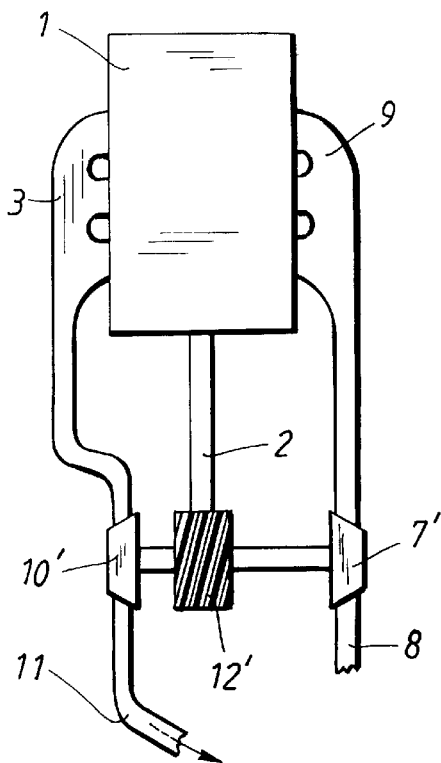

FIG. 2 shows a system similar to that of FIG. 1. The system of FIG. 2 however differs from that shown in FIG. 1 in that it does not comprise a conventional turbo unit as has been described above in connection to FIG. 1. According to the embodiment, there is instead provided only one turbine 10', which is connected to the power transmission 12' which in turn is connected to a compressor 7', and to the crankshaft 2. Energy is absorbed from the exhaust gases in the exhaust pipe 3 and transferred via the power transmission 12' to both the crankshaft 2 and the compressor 7'. Alternatively, the power which is outputted by the crankshaft 2 can be utilized to drive the compressor 7'. This can be useful when power from the outgoing shaft 2 is to be utilized to compress a relatively large amount of air into the inlet casing 9.

Figure 3:
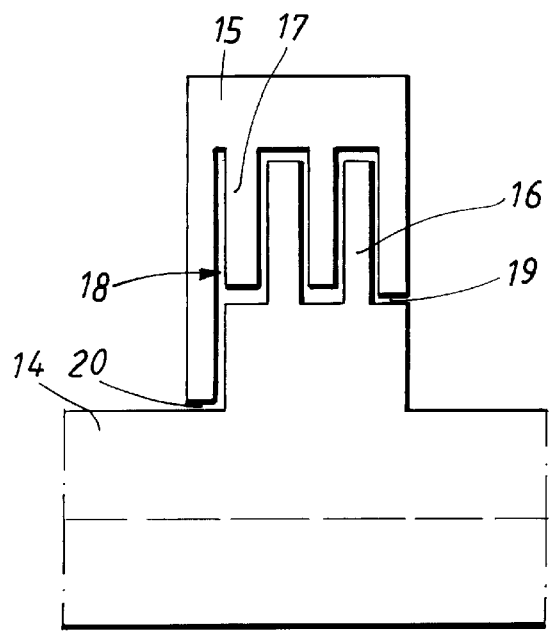
FIG. 3 shows a cross-section of a viscous coupling.

FIG. 3 shows a cross-section of a viscous coupling which is preferably arranged between the turbine of the turbo compound unit and the outgoing shaft of the engine (see FIGS. 1, 2 and 3). The viscous coupling comprises a first partial element 14 and a second partial element 15. The partial elements 14, 15 are shaped as concentrically arranged rings. The first partial element 14 has a first set of discs 16, while the second partial element 15 has a second set of discs 17. The discs 16, 17 are concentrically arranged, with slit-shaped spaces inbetween them. The partial elements 14, 15 face each other, and are arranged in such a manner that the first discs 16 protrude into the spaces between the second discs 17 and the second discs 17 protrude into the spaces between the first discs 16. In the viscous coupling shown in FIG. 3, the first partial element 14 has two discs 16 while the second partial element 15 has four discs 17. It is of course possible for the partial elements to have more or fewer discs.

The two partial elements 14, 15 are rotatable in relation to each other. The first partial element 14 consists of a body which can be attached to a (not shown) shaft. The body can either be an integrated part of the shaft or consist of a separate body fitted to the shaft. In an alternative embodiment the body can be excluded, in which case the first lamellar units 14 are arranged directly on the shaft.

The second partial element 15 is rotatably journaled radially outside of the partial element 14. The partial elements 14, 15 are arranged in such a manner that a cavity 18 is formed between the lamellar units 14, 15. The cavity 18 is filled with a viscous fluid, preferably silicon oil. The cavity 18 can be filled with silicon oil to an amount which is 70–100% of the total volume of the cavity 18. If the amount of viscous fluid is less than 100% of the total volume, the remainder of the volume of the cavity 18 is gas. The two partial elements 14, 15 are sealed at at least a first and a second surface 19, 20 so that the partial elements 14, 15 are rotatable relative to each other, with no leakage of the viscous fluid in the cavity 18 and also without any undesired substances entering the cavity 18.

When one of the partial elements 14, 15 is rotated, a torque is transferred from the rotated partial element to the other partial element due to the viscosity of the fluid. To be more exact by means of shearing forces a force is transferred from the lamellar units of the one partial element to the lamellar units of the other partial element via the viscous fluid. The power transferred depends on the total area of the surfaces facing each other and which rotate in relation to each other. The transferred torque is furthermore inversely proportional to the distance between two surfaces which face each other. The lamellar units 16, 17 which are arranged on the partial elements 14, 15 here serve to increase the working surface of the viscous coupling. In order to adjust the properties of the viscous coupling to the engine-kind, operational conditions, etc. the distance between the lamellar units 16, 17 can be varied. Furthermore, the area of the lamellar units 16, 17 can be varied, as can their surface structure. For example a "rougher" surface will generate a larger shearing force in the viscous fluid than a plane surface. Furthermore, the amount of viscous fluid in relation to the amount of air in the cavity 18 can be varied in order to adjust the coupling to different kinds of operation.

Figure 4:
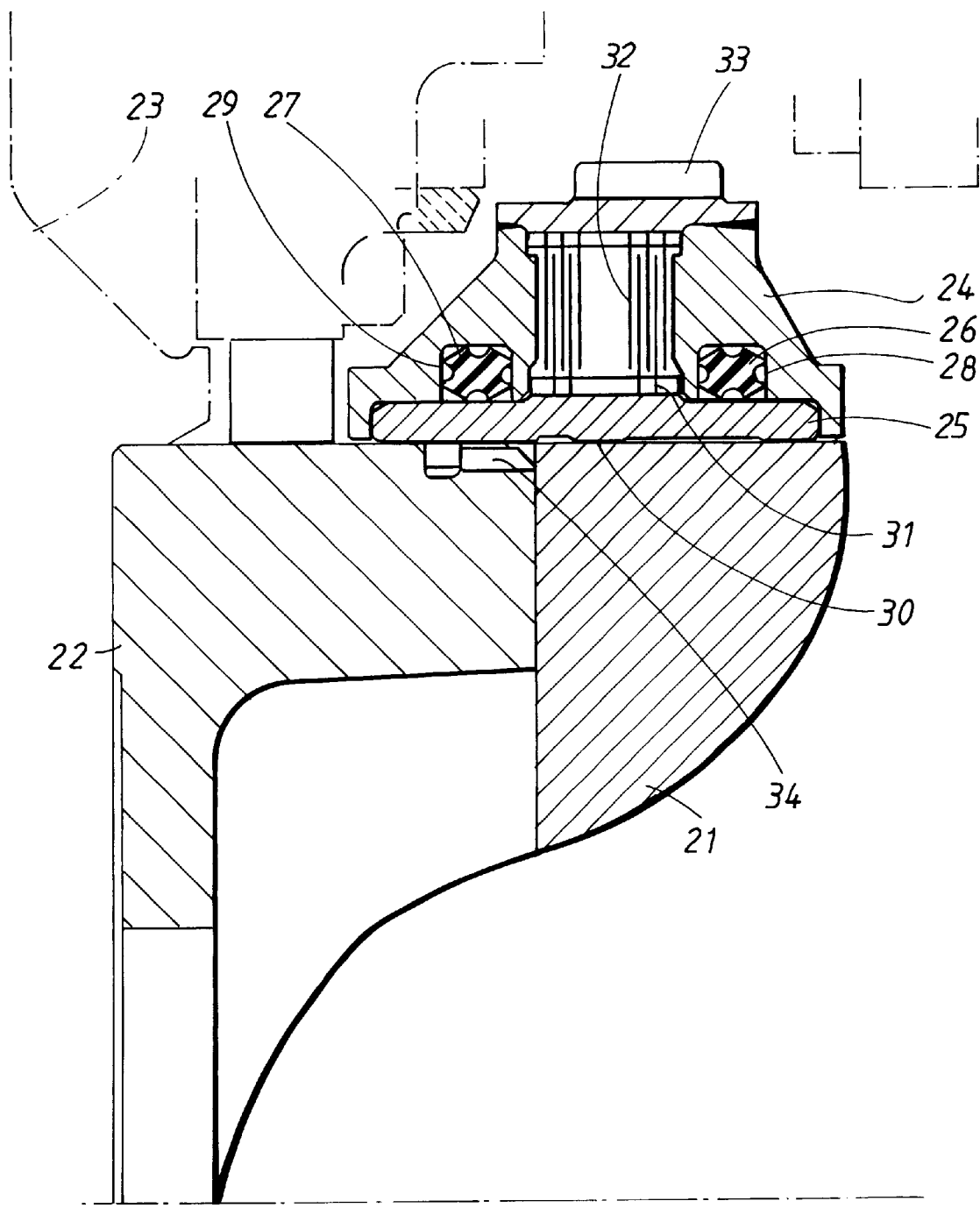
FIG. 4 shows a cross-section through a crankshaft and a power transmission according to the invention.

FIG. 4 shows in greater detail how an engine is connected to a turbo compound unit via a viscous coupling. The drawing shows a cross-section through an end-section of the crankshaft 21 of the engine. On the crank-shaft 21 there is arranged a crankshaft extension 22 to which the fly-wheel 23 of the engine is fitted.

The viscous coupling is encased in a casing 24 which is also an outer part which is rotatably arranged relative to an inner part 25. The casing 24 supports at least one, preferably two sealings 26, 27 arranged in corresponding grooves 28, 29 in the surface of the casing 22 which is in contact with the inner part 25. The sealings 28, 29 serve to prevent the fluid in the viscous coupling from leaking out, and also to prevent fluids and other pollutants from entering the viscous coupling.

The inner part 25 of the viscous coupling is the part of the viscous coupling which is connected to the crank-shaft 21. The inner part 25 is provided with grooves 30 or guides, which fit corresponding grooves or guides on the crankshaft 21 and on the crankshaft extension 22. The inner part 25 of the viscous coupling is furthermore fixedly attached to a first set of lamellar units 31 (see FIG. 4), while the casing 24 is fixedly connected to a second set of lamellar units 32. The outer part of the casing 24 is provided with cogs 33 for engagement in a cog-transmission which transfers power from a turbine in the turbo compound unit. Furthermore, the inner part 25 is connected with the crankshaft extension 22 via a splined joint 34. In this way, power can be transferred through the turbo compound unit via the viscous coupling and, to the crank-shaft 21 of the engine. Alternatively, the crank-shaft extension 22 and the inner part 25 can be made as one single integrated component.

The invention is not limited to the above-described embodiments but can be varied within the scope of the appended claims. For example, the unit according to the invention can be utilized to supply power both to and from the crankshaft of the engine. Furthermore, the above-mentioned arrangement with a viscous coupling can be arranged anywhere in the chain between the spindle of the turbine 10 and the crankshaft 2, i.e. it does not need to be arranged directly on the crankshaft. It is however advantageous if the viscous coupling is arranged as close to the crankshaft as possible, since this is a source of disturbances. The positioning of the viscous coupling depends on, for example, construction demands and the space available in the application in question.

Furthermore, the transmission of power is preferably constant when operating the engine 1, i.e. the power transmission essentially depends on the gearing in the power transmission 12 and is thus essentially independent of for example the number of revolutions of the engine.

Finally, the lamellar units of the viscous coupling do not need to be arranged as ring-shaped elements which protrude inwards towards a cavity (see FIGS. 3 and 4), but instead the lamellar units can also consist of a number of essentially cylindrically shaped elements which are concentrically arranged around the crankshaft with an extension in the axial direction. Generally, in this case half of these cylinder elements are arranged on the casing of the viscous coupling and half are arranged on the inner part of the viscous coupling. The one end of the respective cylinder element is then connected to the casing alternatively the inner part, while the other end of the respective cylinder element is directed in towards the cavity so that a certain cylinder element arranged on the casing protrudes inbetween two cylinder elements arranged on the inner part and vice versa.

What is claimed is:

1. An apparatus for transmission of power in a combustion engine producing an exhaust gas stream and including a crankshaft, said apparatus comprising at least one device for absorbing energy from said exhaust gas stream, and power transmission means for transferring power from said at least one device to said crankshaft, said power transmission means including a viscous medium whereby said power is transferred to said crankshaft by means of shearing forces of said viscous medium.

2. The apparatus according to claim 1, wherein said at least one device comprises at least one turbine driven by said exhaust gases.

3. The apparatus according to claim 1 or 2, further comprising at least one compression device for compressing air for delivery to said combustion engine, said at least one compression device being connected to said power transmission means.

4. The apparatus according to claim 3, wherein said at least one compression device comprises at least one compressor.

5. The apparatus according to claim 1, wherein said power transmission means comprises a first partial element connected to said crankshaft, and a second partial element connected to said at least one device, said first and second partial elements being rotatably journaled relative to each other, and protruding into each other so as to form a cavity between said first and second partial elements, said cavity containing said viscous medium, whereby rotation of said first partial element transfers power through said viscous medium to said second partial element.

6. The apparatus according to claim 5, including a first set of lamellar units supported by said first partial element and a second set of lamellar units supported by said second partial element, whereby said first and second sets of lamellar units consist of ring-shaped elements directed towards said cavity.

7. The apparatus according to claim 5, including a first set of lamellar units supported by said first partial element and a second set of lamellar units supported by said second partial element, said first and second sets of lamellar units consisting of essentially cylindrically-shaped elements concentrically arranged around said crankshaft.

8. The apparatus according to claim 3, wherein said cavity is filled with said viscous medium, whereby the amount of said viscous medium comprises from 70–100% of the total volume of said cavity.

9. The apparatus according to claim 3, wherein said viscous medium comprises silicon oil.

10. A method for the transmission of power in a combustion engine producing an exhaust gas stream and including a crankshaft, said method comprising:

absorbing energy from said exhaust gas stream, and transmitting said energy to said crankshaft by means of the shearing forces of a viscous medium.

11. A method according to claim 10, wherein said absorbing of said energy is carried out by means of a turbine.

12. A method according to claim 10 or 11, further comprising compressing air to said engine by means of at least one compressor and also transmitting said energy to said at least one compressor.

13. An apparatus for transmission of power in a combustion engine producing an exhaust gas stream and including a crankshaft, said apparatus comprising:

at least one device for absorbing energy from said exhaust gas steam; and power transmission means for transferring power from said at least one device to said crankshaft, said power transmission means being directly connected to said crankshaft, and including an outer casing portion connected to said at least one device, an inner casing portion connected to said crankshaft, said outer casing portion being rotatable with respect to said inner casing portion, a first plurality of lamellar units attached to said inner casing portion, a second plurality of lamellar units attached to said outer casing portion, a viscous medium contained within said casing, and sealing means for sealing said inner casing portion to said outer casing portion, whereby said power is transferred directly to said crankshaft by means of shearing force of said viscous medium.

* * * * *

UNITED STATES PATENT AND TRADEMARK OFFICE
CERTIFICATE OF CORRECTION

PATENT NO.    : 6,408,626 B1                                              Page 1 of 1
DATED         : June 25, 2002
INVENTOR(S)   : Jan Arnell It is certified that error appears in the above-identified patent and that said Letters Patent is hereby corrected as shown below:

<u>Title page,</u>
Item [86], PCT No. Section: "October 28, 1998" should read -- October 29, 1998 --.

<u>Column 5,</u>
Line 55, delete the "," after the word "and".

Signed and Sealed this

Twenty-ninth Day of October, 2002

*Attest:*

*Attesting Officer*

JAMES E. ROGAN
*Director of the United States Patent and Trademark Office*